US007289062B2

(12) United States Patent
Hudson et al.

(10) Patent No.: US 7,289,062 B2
(45) Date of Patent: Oct. 30, 2007

(54) METHOD AND DEVICE FOR ACCURATELY POINTING A SATELLITE EARTH STATION ANTENNA

(75) Inventors: Erwin C. Hudson, Centennial, CO (US); Remberto L. Martin, Centennial, CO (US)

(73) Assignee: WildBlue Communications, Inc., Greenwood Village, CO (US)

( * ) Notice: Subject to any disclaimer, the term of this patent is extended or adjusted under 35 U.S.C. 154(b) by 340 days.

(21) Appl. No.: 11/058,000

(22) Filed: Feb. 15, 2005

(65) Prior Publication Data

US 2006/0181455 A1 Aug. 17, 2006

(51) Int. Cl.
*H01Q 3/00* (2006.01)

(52) U.S. Cl. ........................................ 342/359; 342/76

(58) Field of Classification Search ................. 342/76, 342/359, 424, 427; 343/754, 757; 455/286, 455/304, 306

See application file for complete search history.

(56) References Cited

U.S. PATENT DOCUMENTS 4,858,229 A * 8/1989 Rosen et al. ................ 370/325
5,465,410 A * 11/1995 Hiben et al. ................ 455/266
5,839,050 A * 11/1998 Baehr et al. ............... 455/2.01
5,991,622 A * 11/1999 Henry, Jr. .................. 455/434
6,047,171 A * 4/2000 Khayrallah et al. ......... 455/266
2007/0037512 A1* 2/2007 Godwin ..................... 455/3.02

* cited by examiner

*Primary Examiner*—Dao Phan
(74) *Attorney, Agent, or Firm*—Baker Botts L.L.P.

(57) ABSTRACT

A device for measuring the received signal strength at an Earth station antenna has the capability to provide an accurate pointing indication when the frequency bands and other key characteristics of the satellite signals are not uniform over the coverage area. The device has an input port, a plurality of passive or active signal filters, a filter selector and an output port. The device may further contain a signal amplifier with automatic or manual gain control. A plurality of filters is provided which may be coupled singularly or in combination between the input port and the output port. Each filter or combination of filters is associated with a particular geographic area and capable of allowing the satellite signal assigned to that geographic area to pass while attenuating or blocking other signals, noise and interference. The filter selector is used to connect the appropriate filter or combination of filters between the input port and the output port. A signal amplifier with manual or automatic gain control may be included to provide an output signal at the desired signal level. The output port may be connected to a power measuring unit, antenna pointing meter or other similar device to provide an accurate antenna pointing indication in the particular geographic area corresponding to the filter or filter combination selected.

21 Claims, 3 Drawing Sheets

METHOD AND DEVICE FOR ACCURATELY POINTING A SATELLITE EARTH STATION ANTENNA

TECHNICAL FIELD

This invention relates in general to wireless communication systems, and more particularly to accurately pointing a satellite Earth station antenna based on the strength of the signal received in a satellite communication system.

BACKGROUND

With the rapid growth in communication usage in recent years and the high cost of adding landline infrastructure, satellite systems have become an increasingly common solution for providing data and voice communication. Satellite links, either one-way or two-way, may be used for communication between a satellite and a population of user Earth station terminals. These user Earth station terminals may each include an Earth station antenna and various transmit and receive equipment appropriate for communicating with the satellite. These user Earth station terminals may be clustered in a single urban or rural area or may be widely installed over large geography, which may include entire continents and ocean regions. Such systems can provide satellite communication services for numerous and dispersed users in an inexpensive manner.

To allow efficient operation of a satellite system of this type, a satellite provider may utilize several antenna beams formed by one or more satellites to transmit information to and receive information back from user Earth station terminals. Each satellite antenna beam may be associated with a particular geographic area and used for exchanging information with users in that area. Furthermore, each satellite antenna beam may be assigned a particular frequency band or frequency bands, contiguous or non-contiguous, in which to exchange information with users in the area associated with that beam. The use of multiple satellite antenna beams and the allocation of frequency bands to each beam, especially when the total number of beams is greater than the total number of frequency bands, is known as antenna beam frequency reuse. With antenna beam frequency reuse, a user Earth station terminal in a particular location may transmit and receive signals on a beam operating in entirely different frequency bands than other terminals pointed at the same satellite or satellites, but located in different areas where the satellite service is provided through other beams.

When installing a user Earth station antenna, an installer may attempt to point the user antenna to maximize the strength of the signal received from the satellite. In a satellite system incorporating antenna beam frequency reuse however, the signal of interest at two different user terminal locations may be in different frequency bands and may be different in other key characteristics as well. Power sensing devices often used by installers to point user Earth station antennas, commonly referred to as antenna pointing meters, are typically designed to sense the total power received, both signal and noise, from a satellite across a number of channels or frequency bands. Such pointing meters may not be effective in a satellite system incorporating antenna beam frequency reuse since the signal radiated toward a specific location may be in a single channel or frequency band. In this case, the antenna pointing meter senses the total power due to satellite radiation in one channel or frequency band plus noise power due to background noise and any interfering signals present across the channels or bands where no signal is available. Since background noise power is essentially independent of user Earth station antenna orientation, an antenna pointing meter used in this manner is desensitized by noise and is not an effective indicator of maximum signal power from the satellite.

SUMMARY

Particular embodiments of the present invention provide an improved device and techniques for accurately pointing a satellite Earth station antenna, especially in satellite systems employing antenna beam frequency reuse.

In accordance with one embodiment of the present invention, a method of pointing a satellite Earth station antenna includes selecting a signal filtering device, which may be passive or active, associated with the location at which the Earth station antenna is installed, wherein the selected filter may be optimized to the frequency band or bands and other key characteristics of the satellite signal of interest, while effectively blocking other signals, noise and interference at frequencies not associated with that antenna location. A measure of the satellite signal power passing through this selected filter is used as an indicator to point the Earth station antenna at the satellite.

The method also includes constructing a device or devices that attach directly or indirectly to a satellite antenna pointing meter, such device or devices consisting of a plurality of filters associated with various geographic locations and a switch or other method of allowing the installer to select the appropriate filter based on the location of the Earth station antenna.

Additionally, the method includes incorporating a plurality of filters internal to a power sensor such as an antenna pointing meter such that the selection of filters based on geographical location and the sensing of satellite signal power are done in the same device. This method includes the possibility of removable filters, removable filter modules, pluggable filters, mechanically tunable filters, electronically tunable filters, and integrated sensing of location using an internal or external location sensor to automatically select or tune to the appropriate filter characteristic.

In accordance with another embodiment of the present invention, a device for allowing installers to accurately point Earth station antennas in a satellite system incorporating spot beam frequency reuse consists of a coaxial input port, a plurality of electronic filters, a filter selector to choose one or a combination of the electronic filters, a signal amplifier, and a coaxial output port. Each filter or filter combination is associated with a particular geographic area with the filter characteristics optimized to the satellite signals of interest in that geographic area and designed to effectively block noise and any interfering signals that may be present. The filter selector is capable of selectively connecting the signal amplifier to an output of one or more of the filters and the signal amplifier is capable of amplifying the output of one or more of the filters. Additionally, the output port, which may be attached to a power sensor or antenna pointing meter, provides a signal level that is highly sensitive to the power of the desired satellite signal and therefore highly sensitive to antenna pointing error.

An extension of this embodiment may include a kit of such signal filters, possibly marked or otherwise keyed to correspond to various geographic locations, from which the antenna installer selects the appropriate filter to use for the satellite signal power measurement based on the specific location at which the Earth station antenna is being installed. The selected filter may be attached directly or indirectly to the power sensing device such as an antenna pointing meter or otherwise placed between the antenna and power sensing device using various cables, adapters, external devices or other kit. Another extension of this embodiment may include a tunable filter or filters, either mechanical or electronic, which manually or automatically tune to the appropriate filter characteristics for one or several geographical locations.

One or more technical advantages of the present invention may be readily apparent to one skilled in the art from the following figures, descriptions, and claims. Technical advantages of certain embodiments of the present invention include providing an inexpensive and portable solution for isolating and measuring the strength or other signal quality measure of satellite signals to accurately point Earth station antennas in systems where the frequency bands and characteristics of the satellite signals are not uniform over the coverage area. In one embodiment for example, a commonly available antenna pointing meter may be fitted with an inexpensive adapter and used to accurately point an Earth station antenna in a system employing antenna beam frequency reuse that may otherwise require a custom-built and more expensive antenna pointing device. Other technical advantages of certain embodiments of the present invention include providing a flexible system for measuring satellite signals that can be easily updated or reconfigured to adjust to changes in the overall system. While specific advantages have been enumerated above, various embodiments may include all, some, or none of the enumerated advantages.

DESCRIPTION OF EXAMPLE EMBODIMENTS

Figure 1:
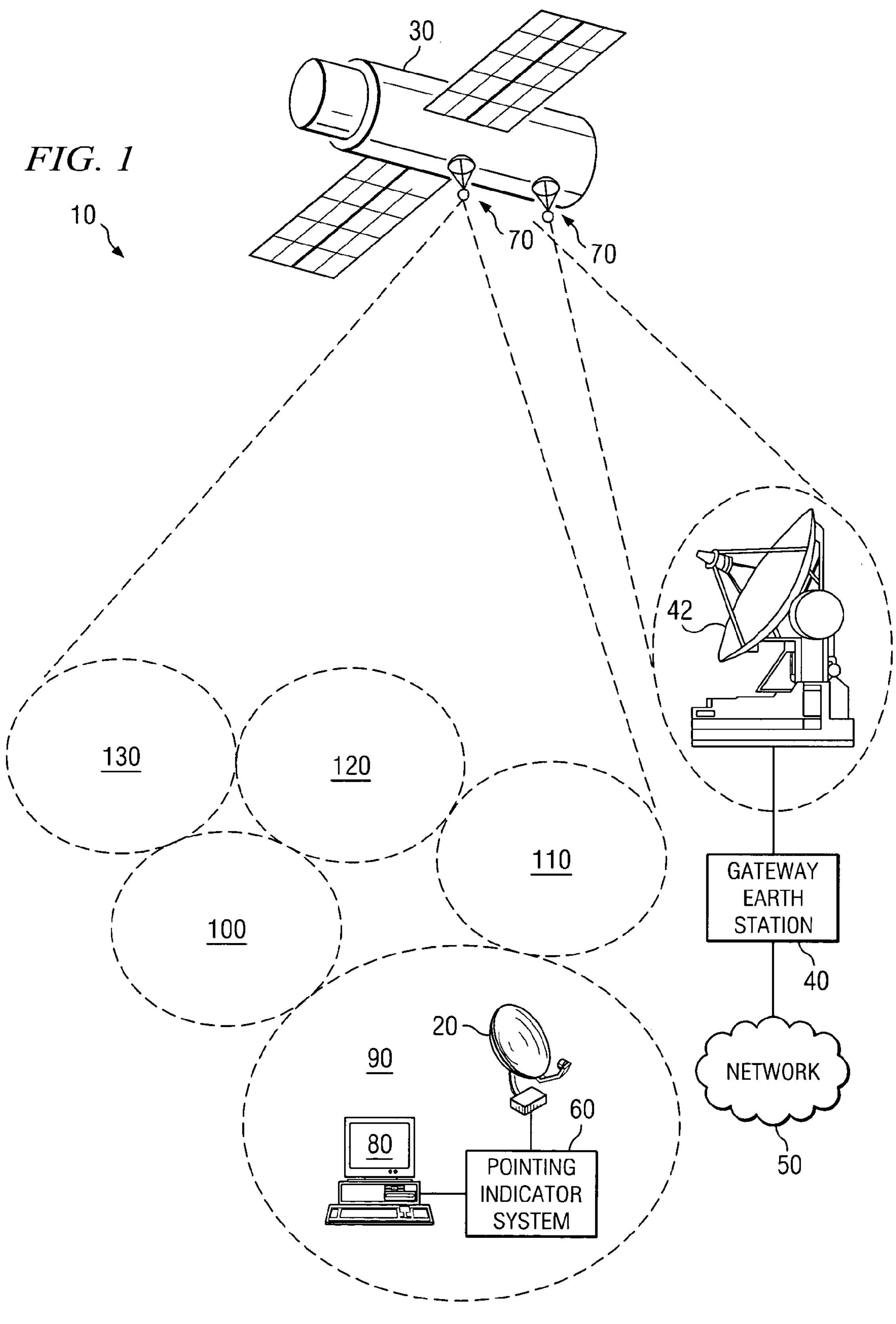
FIG. 1 illustrates a communication system that utilizes an antenna pointing indicator system according to a particular embodiment of the present invention.

FIG. 1 illustrates an example communication system 10 that provides voice and/or data communication to a communication device 80 through satellite antennas 70. As illustrated, communication system 10 includes a user Earth station antenna 20, a satellite or satellites 30, a gateway Earth station 40, a network 50, an antenna pointing indicator system 60, and a user communication device 80. Satellite antennas 70 may form a plurality of overlapping and/or non-overlapping beams on the earth, depicted as satellite antenna beams and corresponding geographic coverage areas 90, 100, 110, 120 and 130. A user may utilize user Earth station antenna 20, depicted in satellite antenna beam 90 for purposes of illustration, to communicate with gateway Earth station 40 through one or more satellites 30 for the purpose of accessing network 50. During installation and/or operation, antenna pointing indicator system 60, according to a particular embodiment of the present invention, may be used to determine an optimal orientation for user Earth station antenna 20 in a particular geographic coverage area 90 which maximizes the strength of the signal received from a particular satellite 30 that may be in a different frequency band or otherwise different than the satellite signal in one or more geographic coverage areas 100, 110, 120 and 130.

In a particular embodiment of communication system 10, gateway Earth station 40 provides two-way broadband Internet service on network 50 using Fixed Satellite Service (FSS) Ka-band spectrum to communicate with user Earth station antenna 20. In this example embodiment, user Earth station antenna 20 may be configured to communicate in a particular beam formed by satellite antennas 70 assigned to a particular geographic area 90 in which user Earth station antenna 20 is located. Geographic areas 100, 110, 120 and 130 represent any number of antenna beams, outside the geographic area covered by beam 90, on which satellite 30 provides communication services to other users. In this embodiment, the Ka-band satellite uses antenna beam frequency reuse such that the uplink and downlink signals in each of geographic coverage areas 90, 100, 110, 120 and 130 may be quite different and may be in non-overlapping frequency bands.

User Earth station antenna 20 receives signals from and transmits signals to satellite antennas 70 to facilitate communication on network 50 for a user of communication system 10. User Earth station antenna 20 may represent any collection of software and/or hardware suitable for communicating with satellites 30 in a manner appropriate based on the configuration and characteristics of communication system 10. In addition, the interface between user Earth station antenna 20 and user communication device 80 may be digital or analog, wired or wireless, and may be at any intermediate frequency and signal level appropriate for that particular application. User Earth station antenna 20 may be a directional emitter capable of communicating with satellites 30 that are approximately along the line-of-sight of user Earth station antenna 20, and the strength of signals received by user Earth station antenna 20 from satellite antennas 70 may depend on how accurately user Earth station antenna 20 is aimed at satellite 30. In a particular embodiment, user Earth station antenna 20 communicates with satellite antennas 70 using microwave signals and includes microwave electronics capable of receiving and transmitting signals at a frequency greater than approximately one (1) Gigahertz (GHz).

Satellite 30 facilitates communication between communication device 80 and gateway Earth station 40. In particular, satellite 30 includes satellite antennas 70 which form one or more antenna beams that are operable to transmit information to and receive information from user Earth station antenna 20 and/or gateway Earth station 40. In a particular embodiment, satellite 30 may represent any appropriate device in orbit around the Earth, airborne, or fixed at a sufficient height to allow for communication using line-of-sight transmissions. Although the description below focuses on an embodiment of communication system 10 that includes a single satellite 30 that supports multiple satellite antennas 70 capable of communicating with user Earth station antenna 20, gateway Earth station 40, and other ground-based components of communication system 10, alternative embodiments of communication system 10 may include any number of satellites 30 and the total number of satellite antennas 70 operating in communication system 10 may be distributed among these satellites 30 in any appropriate manner. The antenna pointing indicator system may also be used to accurately position any size and type of directional antenna, including large reflector antennas as might be employed at a gateway Earth station. Additional embodiments where the antennas consist of any number of user Earth station antennas, any number of gateway Earth station antennas, user Earth station antennas communicating directly through the satellite, and gateway Earth station antennas communicating directly through the satellite are not precluded.

Satellite antennas 70 transmit information to and receive information from user Earth station antennas 20, gateway Earth station 40, and other appropriate ground-based components of communication system 10. Satellite antennas 70 may represent antennas, receivers, and/or any other appropriate components for transmitting and/or receiving information wirelessly. In a particular embodiment, satellite antennas 70 form a plurality of beams each associated with particular geographic regions such as 90, 100, 110, 120 and 130 and are responsible for transmitting information to and receiving information from ground antennas located in those regions. In a particular embodiment of communication system 10, each antenna beam formed by satellite antennas 70 is also assigned a unique frequency or range of frequencies on which that satellite antenna 70 transmits information to user Earth station antenna 20. For the purpose of simplicity, satellite antennas 70 are described as transmitting on an assigned "frequency." In particular embodiments, however, this "frequency" may represent a single frequency, a continuous range of frequencies, or a plurality of separate frequency ranges representing a portion of the total spectrum utilized by all satellite antennas 70 in communication system 10. Thus, satellite antennas 70 may transmit information to user Earth station antenna 20 in a particular geographic area 90 associated with that satellite antennas 70, using a unique frequency assigned to that geographic area in the corresponding antenna beam formed by satellite antennas 70.

Gateway Earth station 40 receives signals from and transmits signals to user Earth station antenna 20 through gateway Earth station antenna 42 and satellites 30 to provide communication device 80 with access to network 50. Gateway Earth station 40 may additionally include any appropriate combination of software and/or hardware appropriate to facilitate communication for the user on network 50 using a connection through particular satellite antennas 70 and gateway Earth station 40. For example, gateway Earth station 40 may include switches, routers, processors or any other appropriate components to facilitate, authorize, and monitor the user's access and use of network 50, and antennas, receivers, transmitters, and any other appropriate components to facilitate communication between gateway Earth station 40 and satellite antennas 70.

Network 50 represents any form of communication network supporting circuit-switched, packet-based, and/or any other suitable type of communication. Network 50 may include routers, hubs, switches, gateways, traffic controllers, and/or any other suitable component to any suitable form or arrangement. In general, network 50 may comprise any combination of public or private communication equipment such as elements of the Public Switched Telephony Network (PSTN), a global computer network such as the Internet, a local area network (LAN), a wide-area network (WAN), or other appropriate communication equipment.

Communication device 80 may represent any equipment, including appropriate controlling logic, suitable for providing voice, video, or data service to a user. For example, communication device 80 may be an appropriately enabled personal computer (PC), telephone, modem, television, or any other suitable device. Furthermore, depending on the configuration and characteristics of communication system 10, communication device 80 may be a device capable of two-way communication, such as a PC, or one capable of only receiving information from gateway Earth station 40, such as a television. Although, as illustrated, communication system 10 contains only one communication device 80 coupled to a single user Earth station antenna 20 and antenna pointing indicator system 60, particular embodiments of communication system 10 may include any appropriate number of communication devices 80 coupled in any suitable manner to any number of user Earth station antennas 20.

Antenna pointing indicator system 60 senses received satellite power through a signal filtering device that has been optimized to the satellite signals received in geographic area 90 on the corresponding antenna beam formed by satellite antennas 70 where user Earth station antenna 20 is located.

Antenna pointing indicator system 60 may include any combination of hardware and/or software suitable for isolating signals propagating at a particular frequency and/or measuring the strength of signals with particular characteristics associated with geographic area 90. The contents and operation of particular embodiments of antenna pointing indicator system 60 is described in greater detail below with respect to FIGS. 2-4. Although shown in FIG. 1 as coupling to both communication device 80 and user Earth station antenna 20 along a path that also couples communication device 80 and the user antenna to one another, antenna pointing indicator system 60 may instead couple to user Earth station antenna 20 along a different path or may couple to user Earth station antenna 20 indirectly through a connection to communication device 80. Antenna pointing indicator system 60 may consist of a filter assembly with a plurality of selectable filters attached to a power measurement device or an antenna pointing meter commonly used by antenna installers. Additionally, antenna pointing indicator system 60 may represent part of user Earth station antenna 20, and antenna pointing indicator system 60 and user Earth station antenna 20 may be enclosed, at least in part, by a common housing. Similarly, antenna pointing indicator system 60 may represent a part of communications device 80 where antenna pointing indicator system 60 and communications device 80 may be enclosed, at least in part, by a common housing.

In operation, user Earth station antenna 20 communicates with gateway Earth station 40 through satellite 30, for example, to provide communication device 80 with two-way broadband Internet service on network 50. In a particular embodiment of communication system 10, each beam formed by satellite antennas 70 of satellite 30 is associated with a portion of an area serviced by communication system 10 and is responsible for supporting communication on network 50 for user Earth station antennas 20 located in a geographic area 90 assigned to that beam formed by satellite antennas 70. Furthermore, to prevent interference between signals transmitted by the satellite antennas 70 to neighboring geographic areas 100, 110, 120 and 130 and/or for other appropriate reasons, the satellite may employ antenna beam frequency reuse such that the beam formed by satellite antennas 70 transmits information to user Earth station antennas 20 in geographic area 90 in a frequency band uniquely assigned to that geographic area 90.

When installing or operating user Earth station antenna 20 it may be desirable to determine the signal strength of signals transmitted by the beam formed by satellite antennas 70 associated with the geographic area 90 in which user Earth station antenna 20 is located. For example, in a particular embodiment of communication system 10, satellite antennas 70 and user Earth station antenna 20 communicate using line-of-sight transmissions and the strength of the signal received by user Earth station antenna 20 is dependent upon how closely user Earth station antenna 20 points to the actual location of satellite 30. Thus, to initially position user Earth station antenna 20, it may be desirable to measure the strength of the signal received by user Earth station antenna 20 from the relevant beam of satellite antennas 70 using an inexpensive and portable device to determine an appropriate orientation for user Earth station antenna 20. However, particular embodiments of user Earth station antenna 20 may be configured to receive signals across a number of channels over a wide bandwidth and the signal received in a particular beam formed by satellite antennas 70 may be too weak, relative to the total signal, noise and interference power received by the antenna, to provide an adequately sensitive indication of antenna pointing accuracy.

As a result, antenna pointing indicator system 60 is capable of isolating a particular component of the aggregate power received by user Earth station antenna 20. In particular, antenna pointing indicator system 60 isolates the signal component that is transmitted in the beam formed by satellite antennas 70 associated with the geographic area 90 in which user Earth station antenna 20 is located. Antenna pointing indicator system 60 is further capable of measuring the strength of that isolated signal component. For the purposes of this description, the aggregate of all signal, noise and interference power received by user Earth station antenna 20 is described as "total composite signal" while the signal or signals transmitted in a particular beam formed by satellite antennas 70 are referred to as the "beam-unique signal." As described in greater detail below, antenna pointing indicator system 60 may isolate the beam-unique signal from the relevant beam formed by satellite antennas 70 by passing the total composite signal received by user Earth station antenna 20 through a filter or filters selected based on the geographic location of user Earth station antenna 20. After isolating the signal component received in the relevant frequency band, antenna pointing indicator system 60 measures the signal strength of the isolated signal component.

Consequently, particular embodiments of antenna pointing indicator system 60 may allow for faster and more effective installation of user Earth station antennas 20 in communication systems 10 that operate in the manner described above. Furthermore, because particular embodiments of antenna pointing indicator system 60 provide the described functionality using a small number of widely-produced components and/or may be constructed by retrofitting or adapting existing devices as described, particular embodiments of pointing system 60 may be manufactured relatively inexpensively. Thus, particular embodiments of pointing system 60 may provide a number of benefits.

Figure 2:
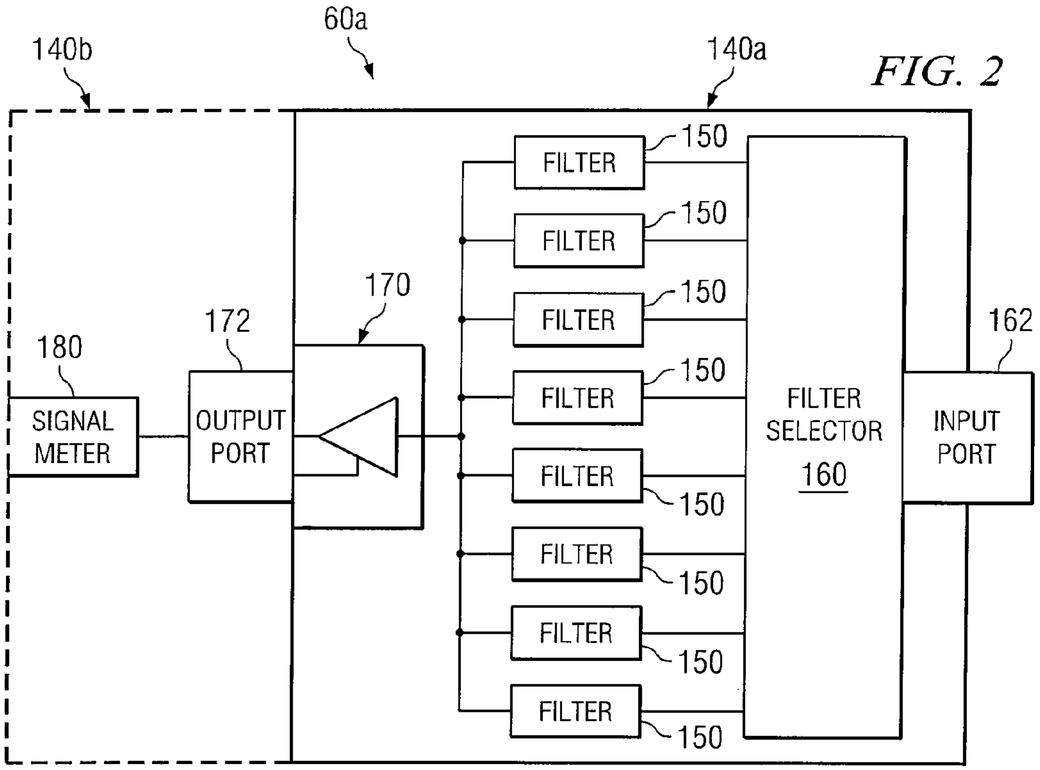
FIG. 2 is a block diagram detailing the contents of a particular embodiment of the antenna pointing indicator system utilized in the communication system of FIG. 1.

FIG. 2 illustrates in greater detail the contents of a particular embodiment, an antenna pointing indicator system 60*a* shown in FIG. 1. In particular, FIG. 2 illustrates antenna pointing indicator system 60*a* in which a plurality of filters 150 are enclosed within a housing 140*a* or 140*b* that also houses other components of antenna pointing indicator system 60*a*. As illustrated, antenna pointing indicator system 60*a* includes a plurality of signal filters 150, a filter selector 160, a signal amplifier 170, a signal meter 180, an input port 162 and an output port 172. In the illustrated embodiment, filter selector 160 selectively couples a selected one of the filters 150 into the signal path between input port 162, which receives the total composite signal from user Earth station antenna 20, and output port 172. The selected filter 150 isolates, within the total composite signal, the beam-unique signal transmitted by satellite antennas 70 associated with geographic area 90 in which user Earth station antenna 20 is located. Antenna pointing indicator system 60*a* then amplifies and measures the beam-unique signal.

Each of the plurality of filters 150 is capable of isolating signals in a particular frequency band or bands associated with that filter 150. More specifically, in a particular embodiment, each filter 150 allows signals received in a particular frequency band to pass through that filter 150, but effectively blocks signals received at all other frequencies. Antenna pointing indicator system 60*a* may include a particular filter 150 associated with each beam or a specific subset of the beams formed by satellite antennas 70 operating in communication system 10 and capable of isolating signals received in the frequency band associated with that beam formed by satellite antennas 70. In a particular embodiment, satellite 30 has 45 beams formed by satellite antennas 70, where each beam formed by satellite antennas 70 is assigned one of eight channels, each channel having a bandwidth of approximately sixty (60) Megahertz (MHz) on which to transmit. In such an embodiment, antenna pointing indicator system 60*a* may include eight filters 150, each representing a bandpass filter with an approximately 60 MHz passband and a center frequency equal to the nominal center frequency at which a particular beam formed by antenna satellites 70 associated with that filter 150 is transmitting.

Filter selector 160 selectively couples a particular filter 150 into the signal path between input port 162 and output port 172. A signal amplifier 170 may be included in the device if appropriate to boost the level of the output of selected filter 150 before being transmitted to signal meter 180 through output port 172. Filter selector 160 may represent a switch or any other appropriate component capable of selectively inserting a particular filter 150 into the signal path. Moreover, filter selector 160 may include buttons, levers, and/or any other appropriate elements to allow a user to control the operation of selector 160.

Signal amplifier 170 may be appropriate, particularly if the implementation of filters 150 is lossy, to increase the level of the filtered signal sufficiently to allow the signal to be measured by signal meter 180. In a particular embodiment, signal amplifier 170 is an active component and may draw power from a battery or other component located within housing 140. Alternatively, signal amplifier 170 may receive power from an external source through input port 162, or through output port 172, or by way of another appropriate component of antenna pointing indicator system 60*a*. Signal amplifier 170 may include any appropriate collection of hardware and/or software capable of amplifying signals transmitted by satellite antennas 70. In a particular embodiment, signal amplifier 170 comprises an appropriately configured integrated circuit amplifier capable of amplifying satellite signals in the approximately 1 to 2 GHz intermediate frequency band between the user Earth station antenna 20 and the user communication device 80.

Signal meter 180 measures a strength of the filtered signal present at output port 172. For the purposes of the description and the claims that follow, the "strength" of the signal as indicated by signal meter 180 may represent a voltage, power level, or any other absolute or relative measurement of any appropriate characteristic of the signal received by signal meter 180. Signal meter 180 may include any hardware and/or software appropriate to measure signals output by signal amplifier 130, based on the characteristics of user Earth station antenna 20, satellite antennas 70, and/or other components of communication system 10. For example, signal meter 180 may include an installer's antenna pointing meter capable of receiving and measuring intermediate frequency band signals in the approximately 1 to 2 GHz intermediate frequency band between a typical user Earth station antenna 20 and user communication device 80.

Signal meter 180 may additionally indicate a result of the measurement to a user of antenna pointing indicator system 60*a* in any appropriate manner including displaying a numeric measurement of the strength, generating an audible or visual indication that the signal strength of the measured signal is above or below a predetermined threshold, or provide any other appropriate indication of the strength of the measured signal. As a result, signal meter 180 may additionally include a dial and pointer, lights, speakers, light-emitting diodes (LEDs), a liquid crystal display (LCD), or any other components for providing a suitable indication of the signal strength. Signal meter 180 may also transmit information relating to the signal strength of the measured signal to appropriate components of antenna pointing indicator system 60*a* and/or communication system 10 to be used by these other components, or may transmit the measured signal itself to other appropriate components, such as communication device 80.

Antenna pointing indicator system 60*a* may also include a housing 140 that encloses particular components of antenna pointing indicator system 60*a* and/or to which particular components of antenna pointing indicator system 60*a* are mounted and forms a single physical device that includes the relevant components. FIG. 2 shows two example configurations of housing 140 to illustrate that signal meter 180 may or may not be enclosed along with signal amplifier 170, filter selector 160, and filters 150 in a common housing 140. If signal meter 180 is not enclosed with the filter assembly 150, filter selector 160 and optional amplifier 170 in a common housing; signal meter 180 may couple to output port 172 using, for example, a coaxial cable to connect the two components. In such an embodiment, signal meter 180 may also be configured to provide power to signal amplifier 170 through the coaxial cable or other element coupling the two components. In general, however, antenna pointing indicator system 60*a* may include a housing 140 shaped and/or configured to include any appropriate combination of the individual elements of antenna pointing indicator system 60*a*. Alternatively, antenna pointing indicator system 60*a* may not include a housing 140 of any type and the elements of antenna pointing indicator system 60*a* may all represent physically separate components.

In operation, in the illustrated embodiment, antenna pointing indicator system 60*a* receives an input signal at input port 162. Antenna pointing indicator system 60*a* may couple to user Earth station antenna 20 and this input signal may comprise the total composite signal received by user Earth station antenna 20 from satellite antennas 70, including background noise and interference. In a particular embodiment, input port 162 couples to user Earth station antenna 20 through a coaxial cable.

Prior to or during operation, an installer or other user of the antenna pointing indicator system 60*a* selects a filter 150 to isolate a particular frequency band of the input signal received at input port 162. More specifically, the installer selects a particular filter 150 based on the geographic area 90 in which user Earth station antenna 20 is located. For example, a manufacturer of antenna pointing indicator system 60*a*, an operator of satellite 30, or any other appropriate party may provide the installer with a chart identifying a particular filter to be used in a particular geographic area 90 to measure the strength of the signal received from satellite antennas 70 assigned to that geographic area 90, and the installer may select an appropriate filter 150 using this chart.

Using filter selector 160, the installer couples input port 162 to the selected filter 150. The input signal passes through the selected filter 150 and the selected filter 150 isolates the frequency band associated with that filter 150, passing individual signals propagating at the associated frequency but effectively blocking signals at all other frequencies. As a result, the signal transmitted by the satellite antennas 70 in a beam associated with the selected filter 150 is passed through the selected filter 150 to signal amplifier 170 and out to signal meter 180, while all noise, interference and other sources of energy outside the bandwidth of interest are effectively blocked.

Signal amplifier 170 receives an output of the selected filter 150. Signal amplifier 170 amplifies the output of the selected filter 150 and provides an amplified signal on output port 172. In a particular embodiment, signal meter 180 is only capable of detecting and measuring signals with signal strength greater than a predetermined minimum threshold, and signal amplifier 170 amplifies the output of the selected filter 150 sufficiently to allow signal meter 180 to accurately measure the strength of the signal. If signal amplifier 170 and signal meter 180 do not share a common housing 140, amplifier output port 172 may represent an external port on the housing 140 enclosing signal amplifier 170. If signal amplifier 170 and signal meter 180 do share a common housing 100, amplifier output port 172 may represent any appropriate connection between signal amplifier 170 and signal meter 180.

Signal meter 180 receives the amplified signal from amplifier output port 172 and measures the strength of the amplified signal. Signal meter 180 may then indicate the signal strength of the amplified signal. For example, signal meter 180 may include a digital LED display that generates a numeric measurement of the strength of the amplified signal in Watts. Additionally, signal meter 180 may also transmit information associated with the signal strength to other components of communication system 10. For example, in a particular embodiment, signal meter 180 may also transmit a measure of the signal strength to an antenna monitoring device that is capable of monitoring the strength of the signal received by user Earth station antenna 20 and adjusting the orientation of user Earth station antenna 20 if the signal strength falls below a predetermined minimum. Furthermore, signal meter 180 may also be coupled to communication device 80 and may transmit the amplified signal to communication device 80.

As a result, antenna pointing indicator system 60*a* may be used to determine the strength of a particular component of the composite signal received by user Earth station antenna 20. More specifically, by selecting an appropriate filter 150 based on the location of the relevant user Earth station antenna 20, a user may be able to isolate and measure a signal transmitted in a particular beam formed by satellite antennas 70 associated with the location of that user Earth station antenna 20. In a particular embodiment of communication system 10, the user may then use the signal strength measurement to determine an initial orientation for user Earth station antenna 20 or to adjust user Earth station antenna 20 during operation to improve reception. Thus, antenna pointing indicator system 60*a* may provide an inexpensive and effective solution for improving the quality of communication service provided by satellite 30.

Figure 3:
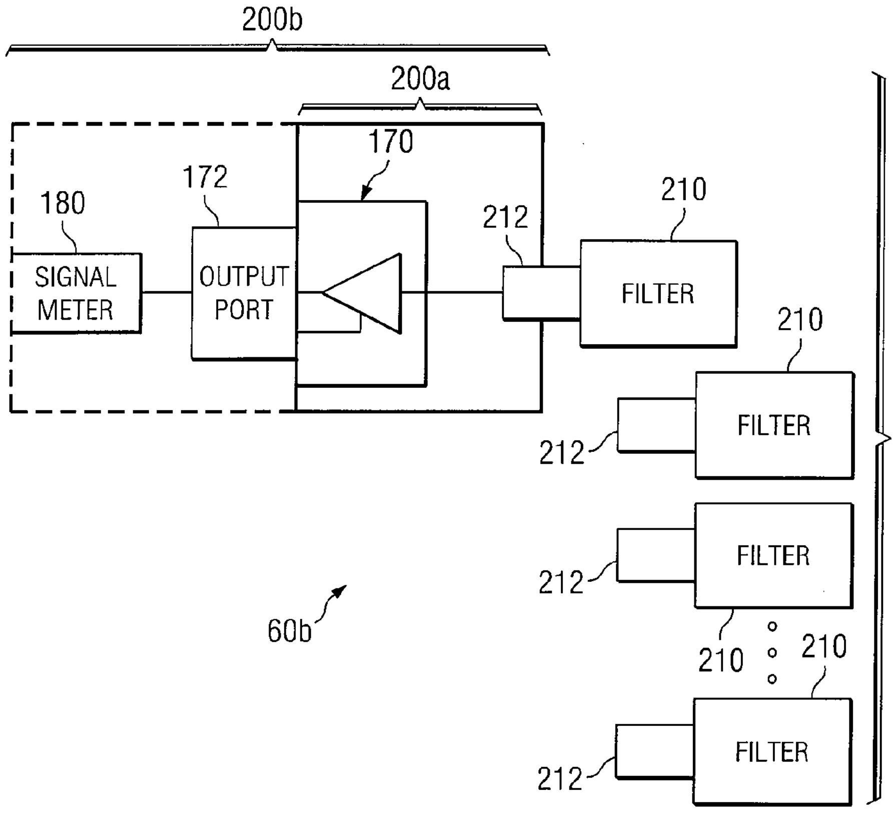
FIG. 3 is a block diagram detailing the contents of an alternative embodiment of the antenna pointing indicator system utilized in the communication system of FIG. 1.

FIG. 3 is a block diagram illustrating an alternative embodiment, an antenna pointing indicator system 60*b*, of antenna pointing indicator system 60 shown in FIG. 1. In general, antenna pointing indicator system 60*b* isolates a particular frequency of the total composite signal received by user Earth station antenna 20 using one of a plurality of attachable filters 210 that is attached to signal amplifier 170 during operation, as described further below. As shown in FIG. 3, antenna pointing indicator system 60*b* includes signal amplifier 170, amplifier output port 172, and signal meter 180, as described above with respect to FIG. 2. Antenna pointing indicator system 60*b* further includes a plurality of attachable filters 210 and an amplifier input port 212. Antenna pointing indicator system 60*b* may provide a flexible and inexpensive embodiment of antenna pointing indicator system 60 that can also be easily reconfigured to adjust to changes in communication system 10.

Additionally, FIG. 3 illustrates two examples of housing 200 that enclose particular components of antenna pointing indicator system 60*b*. As illustrated, signal amplifier 170, amplifier output port 172, and amplifier input port 212 may be enclosed by a housing 200*a* in a particular embodiment of antenna pointing indicator system 60 with signal meter 180 located external to housing 200*a*. Furthermore, in an alternative embodiment of antenna pointing indicator system 60*b*, signal amplifier 170, output port 172, input port 212, and signal meter 180 may all be enclosed by a common housing 200*b*. In addition, there may be embodiments where signal meter 180 has adequate sensitivity such that inclusion of signal amplifier 170 is not appropriate, and the plurality of filters 210 may be attached directly to signal meter 180. As with antenna pointing indicator system 60*a*, however, antenna pointing indicator system 60*b* may include any appropriately shaped and/or configured housing 200 that encloses or supports any appropriate combination of the elements of antenna pointing indicator system 60*b*, or may instead include no housing 200 of any sort.

Each attachable filter 210 is capable of isolating signals received by that attachable filter 210 in a particular frequency band. More specifically, in a particular embodiment, each attachable filter 210 allows signals received in a particular frequency band to pass through, but effectively blocks signals received at all other frequencies. Furthermore, attachable filters 210 are capable of being attached to amplifier input port 212, either singularly or in combination, and removed as appropriate. Attachable filters 210 may be attached and/or coupled to amplifier input port 212 in any appropriate manner. For example, in a particular embodiment, each attachable filter 210 may include a threaded portion, and amplifier input port 212 may also include a threaded portion. In such an embodiment, a particular attachable filter 212 may be coupled and attached to amplifier input port 212 by screwing the threaded portion of the selected attachable filter 210 to the threaded portion of amplifier input port 212.

Antenna pointing indicator system 60*a* may include an attachable filter 210 associated with each beam of satellite antennas 70 operating in communication system 10 and capable of isolating beam-unique signals received in the frequency band associated with that particular beam formed by satellite antennas 70. In a particular embodiment, satellite 30 has 45 beams formed by satellite antennas 70, where each beam formed by satellite antennas 70 is assigned one of eight channels, each channel having a bandwidth of approximately sixty (60) Megahertz (MHz) on which to transmit. In such an embodiment, antenna pointing indicator system 60*b* may include eight attachable filters 210, each representing a bandpass filter with an approximately 60 MHz passband and a center frequency equal to the nominal center frequency at which a particular beam formed by antenna satellites 70 associated with that filter 150 is transmitting.

To operate antenna pointing indicator system 60*b*, a user selects a particular attachable filter 210 based on the location of user Earth station antenna 20. As noted above, with respect to FIG. 1, satellite 30 may transmit signals to a number of geographic areas such as 90, 100, 110, 120 and 130 for example, using a number of beams formed by satellite antennas 70 such that that the signal transmitted into each geographic area or group of geographic areas is at a unique frequency. Antenna pointing indicator system 60*b* may include an attachable filter 210 associated with each frequency being used by the plurality of the beams formed by satellite antennas 70. Thus, prior to operation or at any other appropriate time, the user may determine the frequency band in which the beam formed by satellite antennas 70 provides service into geographic area 90 of user Earth station antenna 20. Additionally, the user may select a particular attachable filter 210 configured to isolate the signal corresponding to satellite transmissions at that frequency. After selecting a particular attachable filter 210, the user may attach the attachable filter 210 to amplifier input port 212, coupling the selected attachable filter 210 to signal amplifier 170. The user may also perform any other appropriate steps to configure pointing system 10 including, if appropriate, coupling amplifier output port 172 to signal meter 180 and coupling user Earth station antenna 20 to attachable filter 210.

Once the selected attachable filter 210 is attached to amplifier input port 212, and any other appropriate configuration has been performed, antenna pointing indicator system 60*b* receives an input signal at the selected attachable filter 210. The selected attachable filter 210 or another appropriate element of antenna pointing indicator system 60*b* may be coupled to user Earth station antenna 20, and the input signal may comprise the composite signal received by user Earth station antenna 20 from satellite antennas 70 and other sources. In a particular embodiment, the selected filter 210 couples to user Earth station antenna 20 through a coaxial cable.

The input signal passes through the selected attachable filter 210 and the selected attachable filter 210 isolates the frequency band associated with that attachable filter 210, passing the beam-unique signals propagating corresponding to geographic area 90 for example, but effectively blocking all signals, noise and interference at other frequencies. As a result, a signal transmitted by the satellite antennas 70 associated with the selected attachable filter 210 is passed through the selected attachable filter 210 to amplifier input port 212 and all signals, noise and interference at other frequencies are blocked by the selected attachable filter 210.

Signal amplifier 170 receives an output of the selected filter 150. Signal amplifier 170 amplifies the output of the selected filter 150 and outputs an amplified signal on amplifier output port 172. In a particular embodiment, signal meter 180 is only capable of detecting and measuring signals with a signal strength greater than a predetermined minimum threshold, and signal amplifier 170 amplifies the output of the selected filter 150 sufficiently to allow signal meter 180 to accurately measure the strength of the signal. If signal amplifier 170 and signal meter 180 do not share a common housing 140, amplifier output port 172 may represent an external port on housing 140 enclosing signal amplifier 170. If signal amplifier 170 and signal meter 180 do share a common housing 140, amplifier output port 172 may represent any appropriate connector coupling signal amplifier 170 and signal meter 180.

Signal meter 180 receives the amplified signal from amplifier output port 172. As described above with respect to antenna pointing indicator system 60*a*, signal meter 180 measures the strength of the amplified signal. Signal meter 180 may then indicate the signal strength of the amplified signal. For example, signal meter 180 may include a digital LED display that generates a numeric measurement of the strength of the amplified signal in volts. Additionally, signal meter 180 may also transmit information associated with the signal strength to other components of communication system 10. For example, signal meter 180 may also transmit a measure of the signal strength to an antenna monitoring device that is capable of monitoring the strength of the signal received by user Earth station antenna 20 and adjusting the orientation of user Earth station antenna 20 if the signal strength falls below a predetermined minimum. Signal meter 180 may also be coupled to communication device 80 and may transmit the amplified signal to communication device 80.

As a result, antenna pointing indicator system 60*b* may also be used to determine the strength of a particular component of the composite signal received by user Earth station antenna 20. More specifically, by selecting an appropriate attachable filter 210 based on the location of the relevant user Earth station antenna 20, a user may be able isolate and measure a signal transmitted in a particular beam formed by satellite antennas 70 associated with the location of that user Earth station antenna 20. Consequently, similar to antenna pointing indicator system 60*a*, antenna pointing indicator system 60*b* may provide a number of benefits relating to the installation and/or operation of user Earth station antenna 20.

Additionally, in particular embodiments of antenna pointing indicator system 60*b*, attachable filters 210 can be replaced without replacing other components of antenna pointing indicator system 60*b*. Furthermore, in particular embodiments, antenna pointing indicator system 60*b* may operate effectively anywhere within a particular geographic area 90 using only the attachable filter 210 associated with that geographic area 90. Thus, a user intending to limit use of antenna pointing indicator system 60*b* to only a single or a few geographic areas such as 90, 100, and 110 may not need to obtain attachable filters 210 for other geographic areas such as 120 and 130, thereby limiting the number of components the user must purchase. As a result, antenna pointing indicator system 60*b* may provide a flexible and inexpensive system for measuring signal strength that can be easily updated to adjust to changes in communication system 10.

Figure 4:
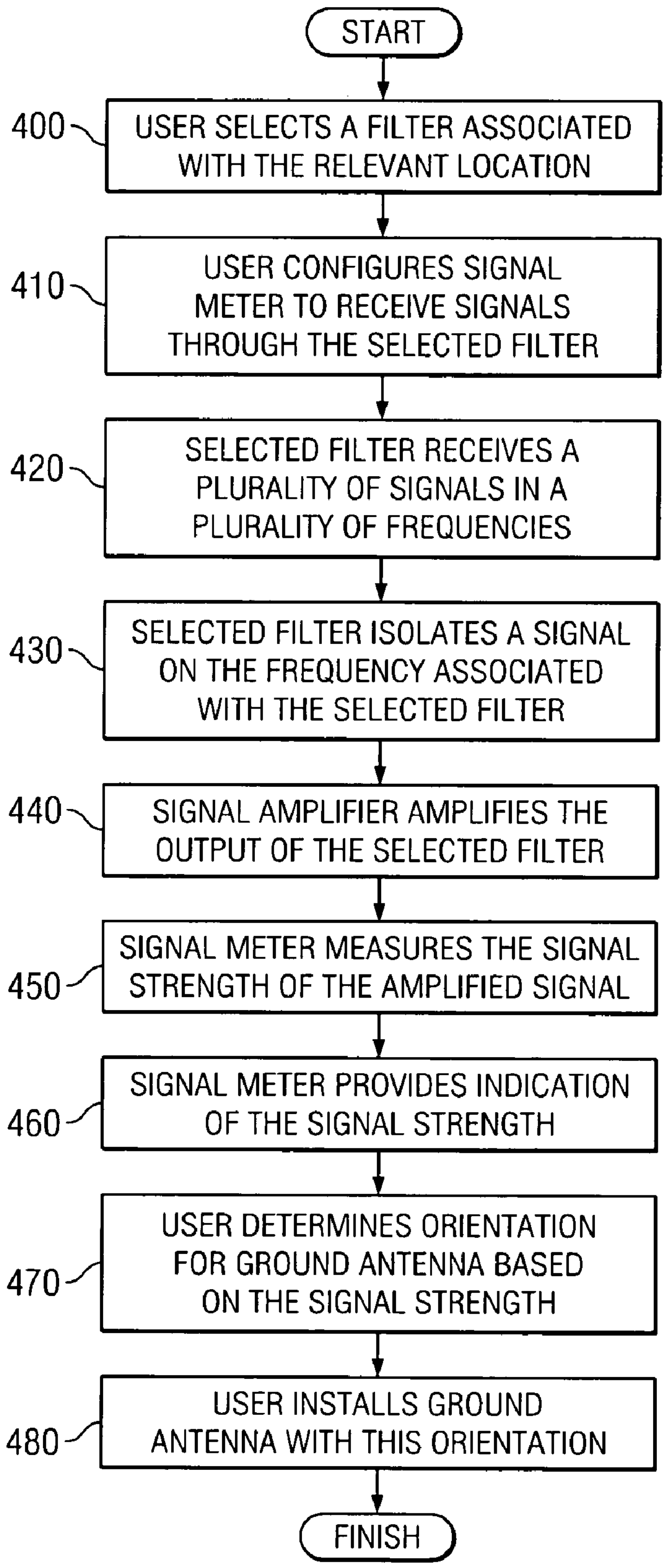
FIG. 4 is a flowchart illustrating steps of an example method for using a particular embodiment of the antenna pointing indicator system.

FIG. 4 is a flowchart illustrating an example method for operating a particular embodiment of antenna pointing indicator system 60. As described further below, the described techniques may be used, as appropriate, with antenna pointing indicator system 60*a*, antenna pointing indicator system 60*b*, or any other appropriate embodiment of antenna pointing indicator system 60. Similarly, the described embodiment of antenna pointing indicator system 60 may include and/or utilize filters 150, attachable filters 210, or any other appropriate component, referred to here generically as "a filter" or "filters", capable of allowing signals received in a particular frequency band to pass while effectively blocking signals received on all other frequencies.

At step 400, the user selects a filter associated with the location at which the signal strength is to be measured. In a particular embodiment, a filter is associated with, for example, each of several geographic areas 90, 100, 110, 120 and 130 and the user selects the specific filter associated with geographic area 90 in which the user's Earth station is located and in which the antenna pointing indicator system 60 will be used. The selected filter is operable to allow the signal in the frequency band associated with geographic area 90 to pass and effectively blocks signals at frequencies not associated with that location. As a result, the selected filter isolates the signal transmitted by a particular beam formed by satellite antennas 70 and assigned to the geographic area 90 in which the user Earth station antenna 20 is located.

At step 410, the user configures signal meter 180 to receive signals through the selected filter. The user may configure signal meter 180 to receive signals through the selected filter by coupling signal meter 180 to a particular filter through signal amplifier 170, switching a filter selector of antenna pointing indicator system 60 so that a particular filter is connected to signal meter 180 through signal amplifier 170, and/or taking any other appropriate step to allow signal meter 180 to receive signals through the selected filter. As one example, in a particular embodiment, the user connects a selected attachable filter 210 to an input port 162 of antenna pointing indicator system 60 through which attachable filter 210 couples to signal amplifier 170 and to signal meter 180. As another example, in a particular embodiment, the user switches filter selector 160 so that filter selector 160 couples the selected filter 150 to signal meter 180 through signal amplifier 170.

At step 420, the selected filter input consists of a plurality of signals, including noise and interference, across a plurality of frequencies. At step 430, the selected filter isolates the signal received in the frequency band associated with the selected filter. As noted above, the selected filter is associated with a frequency band assigned to a particular geographic area 90 in which a particular beam formed by satellite antennas 70 is providing service to the geographic area 90 in which user Earth station antenna 20 is located. The selected filter passes a signal at the associated frequency and effectively blocks signals across all other frequencies. Thus, the isolated signal comprises information transmitted by that beam formed by satellite antenna 70 and excludes all other signals and noise outside the operable bandwidth of that filter 210.

At step 440, signal amplifier 170 amplifies the output of the selected filter, producing an amplified signal. Signal meter 180 measures the signal strength of the amplified signal at step 450. Signal meter 180 also provides an appropriate indication, such as by displaying a numeric value, of the signal strength at step 460. Furthermore, in particular embodiments of antenna pointing indicator system 60, the user may also determine an appropriate orientation for user Earth station antenna 20 based on the signal strength measured by signal meter 180 at step 470. The user may then install user Earth station antenna 20 with this initial orientation at step 480.

Although the present invention has been described in several embodiments, diverse changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A method of accurately pointing a satellite Earth station antenna by:

selecting a signal filter based on the geographic location at which the user Earth station antenna is to be installed;

wherein the selected filter has bandpass characteristics selected based on parameters of a satellite signal associated with that geographic location such that the satellite signal associated with that location is allowed to pass while effectively blocking other signals, noise and interference not associated with the satellite signal provided at that location;

configuring a signal meter to measure satellite signals received by a user Earth station antenna through the selected filter;

receiving from the user Earth station antenna a plurality of signals, noise and interference across a plurality of frequency bands at an input to the selected filter;

isolating, using the selected filter, the satellite signal associated with that geographic location;

measuring a signal strength of the isolated satellite signal with the signal meter; and positioning the user Earth station antenna to maximize the signal strength or other related measure of signal quality as indicated by the signal meter.

2. The method of claim 1, wherein configuring the signal meter comprises attaching the selected filter to at least one of the signal meter and a signal amplifier device that is coupled to the signal meter.

3. The method of claim 1, wherein the signal meter is coupled to a housing, the housing comprising:

an input port which may be attached to an output of a user Earth station antenna;

a plurality of filters with bandpass characteristics based on parameters of the satellite signal associated with that geographic location, such that the satellite signal associated with that location is allowed to pass while effectively blocking other signals, noise and interference not associated with the satellite signal provided in that location;

a filter selector operable to insert a particular filter into the signal path between the user Earth station antenna and the signal meter;

an output port operable to be coupled to the signal meter;

wherein selecting the filter comprises selecting one of a plurality of filters and wherein configuring the signal meter comprises configuring the filter selector so that the satellite signal of interest received at the input port is transmitted through the selected filter to the signal meter.

4. The method of claim 1, wherein the Earth station antenna is located in one of a plurality of satellite antenna beams formed by a plurality of satellite antennas, such that the signals transmitted by the satellite may differ in at least one of frequency band, bandwidth, and spectral shape across the plurality of beams.

5. The method of claim 1, wherein the satellite operates within at least one of Ku-band and Ka-band and provides at least one of two-way audio, two-way data and two-way video service using antenna beam frequency reuse in a plurality of beams formed by the satellite antennas.

6. The method of claim 1, wherein the satellite operates within at least one of Ku-band and Ka-band and provides one-way communication using antenna beam frequency reuse in a plurality of beams formed by the satellite antennas.

7. The method of claim 1, wherein the Earth station antennas are located in one or more beams where less than the full complement of satellite transmitters is activated.

8. The method of claim 1, wherein the signal is transmitted by an airborne communications device operating above the surface of the Earth in a manner to allow for line-of sight transmissions.

9. The method of claim 1, wherein the signal is transmitted by a communications device fixed in a manner to allow for line-of sight transmissions.

10. A device for accurately pointing a user Earth station antenna comprising of:

an input port which may be attached to an output of a user Earth station antenna;

a microwave receiver coupled to the input port and operable to receive signals transmitted at a frequency greater than approximately one (1) Gigahertz (GHz);

a plurality of signal filters which may be coupled to the input port, each filter associated with a particular geographic area and operable to allow a signal received in a frequency band assigned to that geographic area to pass while effectively blocking signals, noise and interference in other frequency bands;

a filter selector operable to insert a selected filter into the signal path between the Earth station antenna and a signal meter;

an output port operable to be coupled to a signal meter and to provide the filtered signal to the signal meter; and a housing enclosing at least a portion of each of the filter selector, the signal amplifier, the input port, and the microwave receiver.

11. The device of claim 10, further comprising a signal amplifier in the signal path between the user Earth station antenna and the signal meter operable to amplify the signal to a level sufficient to allow the signal meter to measure the filtered satellite signal.

12. The device of claim 10, wherein the signal amplifier is operable to receive power through the signal path received through at least one of the input port and the output port.

13. The device of claim 10, further comprising the signal meter, wherein the signal meter is operable to measure the signal strength of the filtered satellite signal; and a housing, the housing enclosing at least a portion of each of the filter selector, the signal amplifier, the amplifier output port, and the signal meter.

14. The device of claim 10, wherein the filter input port comprises a threaded portion operable to couple to a coaxial cable through which signals are transmitted to the filter input port.

15. The device of claim 10, wherein:

the device is operable to operate at an intermediate frequency of approximately 1-2 GHz;

the input port and the output port comprise type-F coaxial connectors;

the plurality of filters comprises eight filters;

the filter selector comprises a mechanical switch with eight positions;

each filter is further operable to allow a signal received within a unique frequency band to pass;

each of the unique frequency bands comprises a range of approximately sixty (60) Megahertz (MHz);

the device has an amplifier with a fixed gain of approximately ten (10) decibels (dB); and the device is powered by a direct current (DC) voltage present at the input port.

16. A device for accurately pointing a satellite Earth station antenna comprising:

a plurality of attachable signal filters, wherein each signal filter is operable to be attached to a signal meter and is associated with a particular geographic area and operable to allow a satellite signal received in the frequency band assigned to that geographic area to pass while effectively blocking signals in other frequency bands; and a signal amplifier, the signal amplifier comprising an amplifier input port which may be selectively attached to a selected signal filter and an amplifier output port operable to be coupled to a signal meter, and wherein the signal amplifier is operable to amplify an output of the selected signal filter to a level sufficient to be measured by the signal meter;

a housing comprising a housing input port, a housing output port, and a socket operable to couple to the selected signal filter, wherein the housing encloses at least a portion of the signal meter and at least a portion of the selected signal filter, wherein the housing input port is operable to couple to the satellite Earth station antenna and the housing output port is operable to couple to the signal meter; and the signal meter, wherein the signal meter is operable to couple to at least one of the housing input port and the housing output port.

17. The device of claim 16, wherein:

each of the signal filters comprises a threaded portion;

the amplifier input and output ports comprise a threaded portion;

the signal meter input comprises a threaded portion; and the threaded portion of each of the signal filters is operable to be connected to either the threaded portion of the amplifier input port or the threaded portion of the signal meter input port.

18. The device of claim 17, wherein:

the device operates at an intermediate frequency of approximately 1-2 GHz;

each signal filter comprises a filter input port that includes a type-F coaxial connectors and a filter output port that includes a type-F coaxial connectors;

the amplifier input port includes a type-F coaxial connector and the amplifier output port includes a type-F coaxial connectors;

the signal meter further comprises a meter input port that includes a type-F coaxial connector;

the plurality of signal filters comprises eight signal filters;

each signal filter is further operable to allow a signal received within a unique frequency band to pass;

each of the unique frequency bands comprises a range of approximately sixty (60) Megahertz (MHz);

the signal amplifier has a fixed gain of approximately ten (10) decibels (dB); and the signal amplifier is powered a direct current (DC) voltage present on at least one of the amplifier input port and the amplifier output port.

19. The device of claim 16, wherein two or more of the signal filters are operable to be attached in combination to at least one of the signal amplifier and the signal meter.

20. A device for accurately pointing a user Earth station antenna comprising of:

an input port which may be attached to an output of a user Earth station antenna, wherein the input port comprises a first type-F coaxial connector;

eight signal filters which may be coupled to the input port, each filter associated with a particular geographic area and operable to allow a signal received within a unique frequency band assigned to that geographic area to pass while effectively blocking signals, noise and interference in other frequency bands, wherein each of the unique frequency bands comprises a range of approximately sixty (60) Megahertz (MHz);

a mechanical switch having eight positions and operable to insert a selected filter into a signal path between the Earth station antenna and a signal meter;

an amplifier having a fixed gain of approximately ten (10) decibels (dB) and operable to amplify the filtered signal;

an output port operable to be coupled to the signal meter and to provide the amplified filtered signal to the signal meter, wherein the output port comprises a second type-F coaxial connector, wherein the device is operable to operate at a frequency of approximately 1-2 GHz and wherein the device is powered by a direct current (DC) voltage present at the input port.

21. A device for accurately pointing a satellite Earth station antenna comprising:

eight attachable signal filters, wherein each signal filter comprises a filter input port that includes a first type-F coaxial connector and a filter output port that includes a second type-F coaxial connector, and wherein each signal filter is operable to be attached to a signal meter and to allow a satellite signal received in a unique frequency band assigned to a particular geographic area associated with that filter to pass while effectively blocking signals in other frequency bands, and wherein each of the unique frequency bands comprises a range of approximately sixty (60) Megahertz (MHz); and a signal amplifier, the signal amplifier having a fixed gain of approximately ten (10) decibels (dB) and comprising:

an amplifier input port that includes a third type-F coaxial connector and which may be selectively attached to a selected signal filter; and an amplifier output port that includes a fourth type-F coaxial connector and that is operable to be coupled to a signal meter comprising a meter input port that includes a fifth type-F coaxial connector, wherein the signal amplifier is operable to amplify an output of the selected signal filter to a level sufficient to be measured by the signal meter, and wherein the signal amplifier is powered by a direct current (DC) voltage present on at least one of the amplifier input port and the amplifier output port and wherein the device operates at a frequency of approximately 1-2 GHz.

* * * * *